United States Patent [19]
Gamble et al.

[11] Patent Number: 5,291,775
[45] Date of Patent: Mar. 8, 1994

[54] SCANNING FORCE MICROSCOPE WITH INTEGRATED OPTICS AND CANTILEVER MOUNT

[75] Inventors: Ronald C. Gamble, Altadena; Paul G. West, Cupertino, both of Calif.

[73] Assignee: Topometrix, Santa Clara, Calif.

[21] Appl. No.: 845,919

[22] Filed: Mar. 4, 1992

[51] Int. Cl.$^5$ .................... G01B 5/28; G01N 23/00
[52] U.S. Cl. ................................ 73/105; 250/306; 250/307
[58] Field of Search .................. 73/105; 250/306, 307, 250/423 F

[56] References Cited

U.S. PATENT DOCUMENTS

| | | | |
|---|---|---|---|
| 4,343,993 | 8/1982 | Binnig et al. | 250/306 |
| 4,868,396 | 9/1989 | Lindsay | 250/306 |
| 4,935,634 | 6/1990 | Hansma et al. | 250/306 |
| 4,999,495 | 3/1991 | Miyata et al. | 250/306 |
| 5,025,153 | 6/1991 | Okada et al. | 250/306 |
| 5,025,658 | 6/1991 | Elings et al. | 73/105 |
| 5,060,248 | 10/1991 | Dumoulin | 250/306 |
| 5,083,022 | 1/1992 | Miyamoto et al. | 250/307 |
| 5,107,114 | 4/1992 | Nishioka et al. | 73/105 |
| 5,142,145 | 8/1992 | Yasutake | 250/306 |
| 5,144,833 | 9/1992 | Amer et al. | 73/105 |
| 5,157,251 | 10/1992 | Albrecht et al. | 250/307 |
| 5,172,002 | 12/1992 | Marshall | 250/306 |

FOREIGN PATENT DOCUMENTS

9212398 7/1992 PCT Int'l Appl. ................ 73/105

OTHER PUBLICATIONS

Burnham and Colton, "Measuring the Nanomechanical Properties and Surface Forces of Materials Using an Atomic Force Miscroscope," J. Vac. Sci. Technology, Jul./Aug. 1989, pp. 2906-2913.
PSI Probe, Park Scientific Instruments, Spring 1992, all pages.
Digital Instruments, Jun. 15, 1991, all pages.
Digital Instruments, NanoScope AFM, Jun. 15, 1991, all pages.
NanoScope Large-Sample SPM, Undated, All pages.
SFM-BD2 Scanning Force Microscope . . . , Park Scientific Instruments, All pages, Spring 1992.
NanoScope II, Digital Instruments, Undated, All pages.
PSI Probe, Park Scientific Instruments, Fall 1991, All pages.

*Primary Examiner*—Hezron E. Williams
*Assistant Examiner*—G. Dombroske
*Attorney, Agent, or Firm*—Fulwider Patton Lee & Utecht

[57] ABSTRACT

The scanning force microscope includes integrated optics for viewing the optical lever arm, probe and sample to be examined. The scanning force microscope includes an improved mount for the probe, which is magnetically secured to the body of the scanning force microscope, to improve ease of handling and mounting the probe assembly. In one preferred embodiment the scanning force microscope, also includes a base portion with a fluid cell for receiving a sample in a sealed gas or liquid environment.

16 Claims, 5 Drawing Sheets

SCANNING FORCE MICROSCOPE WITH INTEGRATED OPTICS AND CANTILEVER MOUNT

BACKGROUND OF THE INVENTION

1. Field of the Invention

This invention relates generally to scanning force microscopes, and more particularly concerns a scanning force microscope with an improved optical lever arm and integrated optics for viewing the lever arm and a sample.

2. Description of Related Art

Scanning force microscopes, also known as atomic force microscopes, are useful for imaging objects as small as atoms. The scanning force microscope is closely related to the scanning tunneling microscope and the technique of stylus profilometry, however in a typical scanning force microscope, deflection of a laser beam by a vertical movement of a probe following the contours of a specimen is amplified by a reflective lever arm to which the probe is mounted. The deflection of the laser beam is typically monitored by a photodetector in the optical path of the deflected laser beam, and the sample is mounted on a stage moveable in minute distances in three dimensions so that the sample can be raster scanned while the vertical positioning of the probe relative to the surface of the sample is maintained substantially constant by a feedback loop with the photodetector controlling the vertical positioning of the sample.

As the sensitivity of the optical lever arm and probe are crucial to the useful operation of such scanning force microscopes, conventional scanning force microscopes generally include optical lever arms of such small dimensions that the optical lever arms and probe assembly can easily be damaged by contact with a sample or during handling, and the optical lever arms and probe assembly is further difficult to handle and mount in the instrument. It would therefore be desirable to provide an improved mount for the probe, which would be easier to handle and position in the instrument.

While a probe can be damaged by too abrupt an approach to a sample before the probe is close enough to the sample to initiate feedback position control, the user typically can not easily view the approach of the lever arm and probe assembly to the surface of the sample to insure precise positioning of the probe. Even where an optical microscope is used in conjunction with the scanning force microscope to view the sample, the arrangement of the optical microscope with the scanning force microscope can be inconvenient and clumsy, and can interfere with the operation of the scanning force microscope. It would therefore also be desirable to provide a scanning force microscope with optics integrated into the scanning force microscope for viewing the optical lever arm and probe, particularly as the probe and sample come in contact.

It would also be desirable to provide a scanning force microscope with the capability of scanning a sample in contact with a fluid, as such a fluid environment can significantly change scanning conditions and opportunities, and can improve the quality of the image of the sample acquired by the instrument. The present invention meets these needs.

SUMMARY OF THE INVENTION

Briefly, and in general terms, the present invention provides for a scanning force microscope with integrated optics for viewing the optical lever arm, probe and sample to be examined. The stability and convenience of such integrated optics significantly improve the ability to control the approach of the probe and sample. Additionally, the compact design of the microscope minimizes the effects of thermal expansion and contraction due to thermal gradients or drift in the vicinity of the instrument. The scanning force microscope further includes an improved mount for the probe, which is magnetically secured to the body of the scanning force microscope, to improve ease of handling and mounting the probe assembly. The scanning force microscope of the invention in one preferred embodiment also includes a removable base portion which can contain a fluid cell for receiving a sample and a fluid environment and having a stage upon which the sample can be mounted for scanning the sample in three dimensions relative to the probe tip.

The invention accordingly provides for a scanning force microscope having a stationary body with integrated optics for examining surface contours of a specimen. The microscope preferably includes scanning means to mount and scan the specimen to be examined in three dimensions or degrees of freedom relative to the body of the microscope, and a reflective optical lever arm means including probe means, secured to the microscope body. The probe means is preferably secured to the optical lever arm means and includes a probe tip to contact and follow the surface contours of the specimen with a substantially constant amount of force.

A laser light source means is also provided in the body of the microscope for producing a focused laser beam directed at and deflected by the optical lever arm means, and photodetector means is provided in the body of the microscope to receive the deflected laser beam and to produce an output signal indicative of the degree of deflection of the laser beam by the optical lever arm means. Means for viewing the optical lever arm, probe means, and an adjacent specimen are also preferably provided in the body of the microscope. In one preferred aspect of the invention, the means for viewing comprises an accessory objective lens mounted in the body of the microscope, although the means for viewing may alternatively also include a charge couple device or miniature video camera.

The optical lever arm means preferably includes a reflective cantilever arm having a free end to which the probe tip is mounted, and the optical lever arm means is preferably magnetically secured to the body. The photodetector means preferably includes a photodetector mounted to the body, and mirror means mounted within the body to deflect the laser beam from the optical lever arm means to the photodetector. Control means are also preferably provided for maintaining a constant force of the probe means against the surface contours of the specimen. The body of the microscope also includes a removable base portion having a chamber for receiving the specimen, and in a preferred alternate embodiment includes a sealed cell for containing the specimen in a selected gas or liquid environment.

These and other aspects and advantages of the invention will become apparent from the following detailed description, and the accompanying drawing, which illustrates by way of example the features of the invention.

DETAILED DESCRIPTION OF THE PREFERRED EMBODIMENTS

Figure 1:
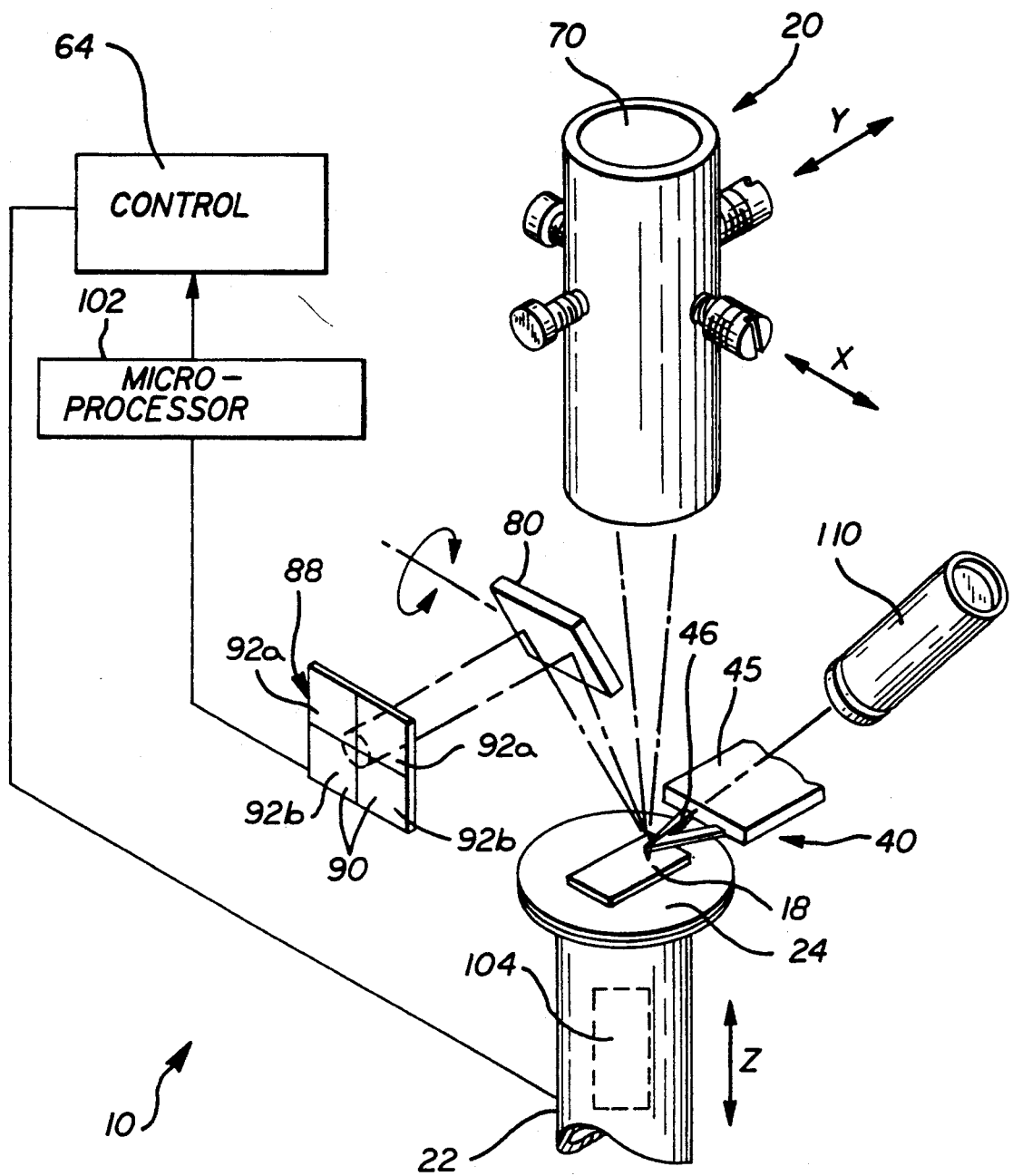
FIG. 1 is an exploded diagrammatic perspective view illustrating the spatial relationships of major elements of the scanning force microscope of the invention.
Figure 2:
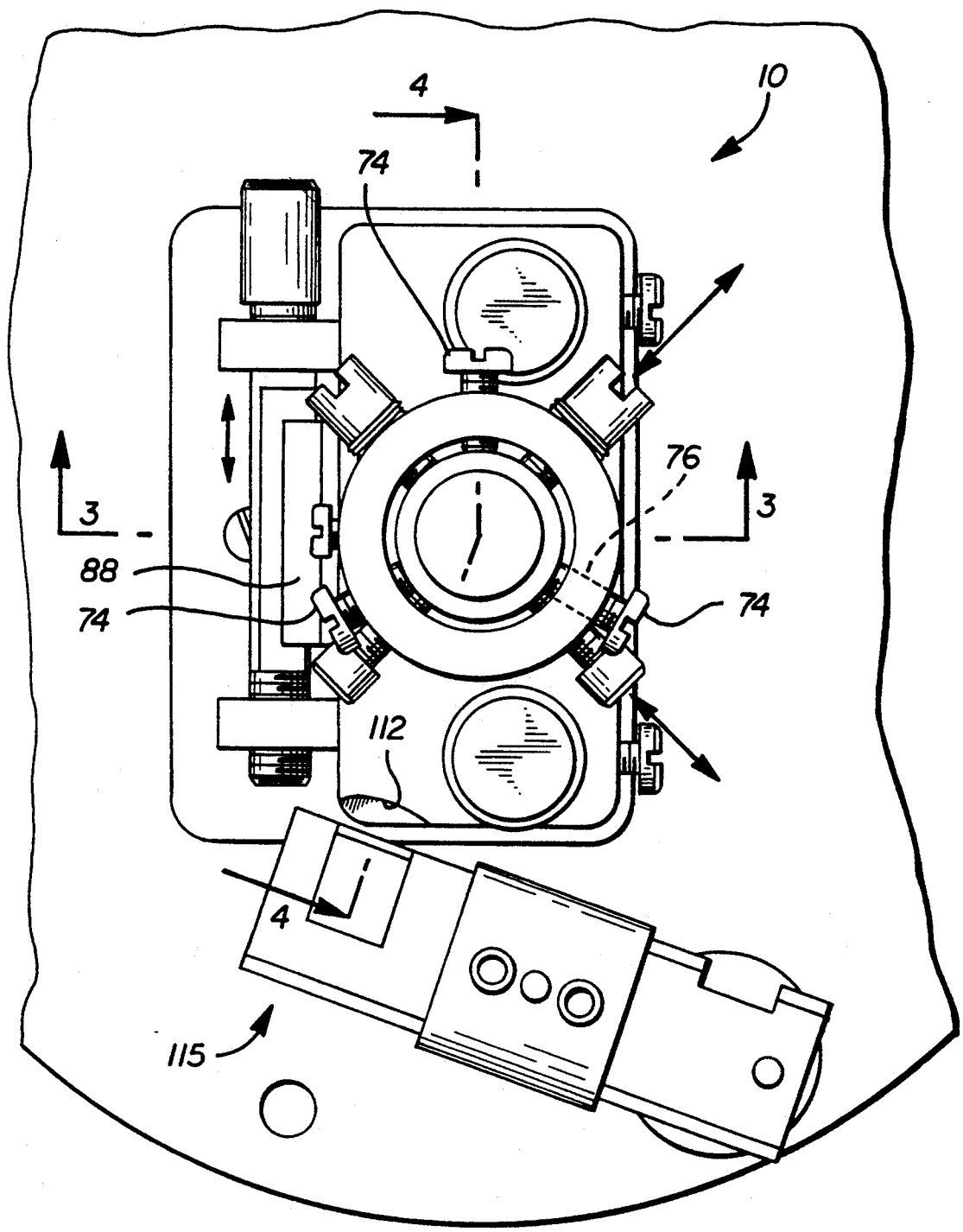
FIG. 2 is a top plan view of the scanning force microscope of the invention.
Figure 3:
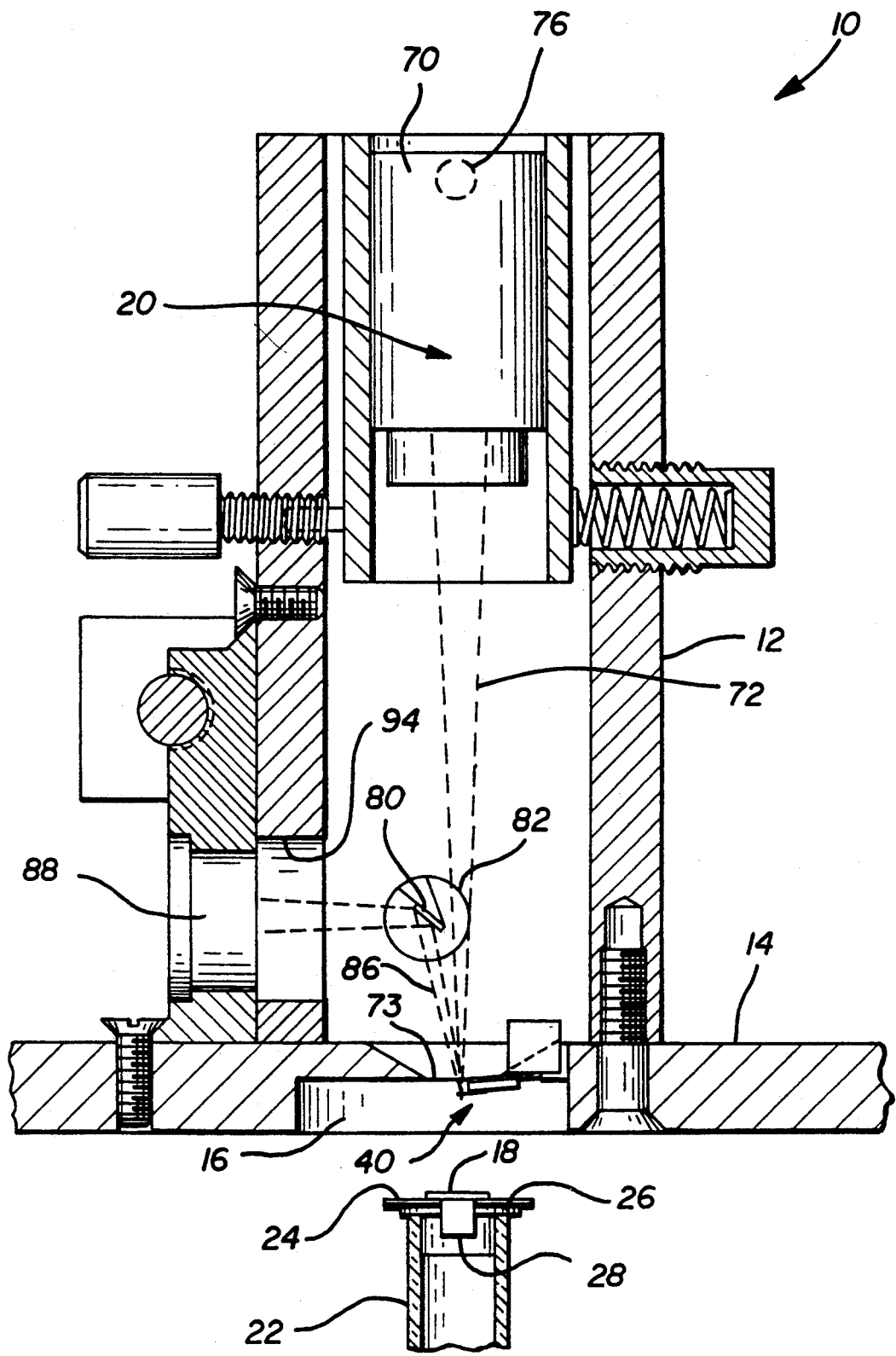
FIG. 3 is a sectional view of the scanning force microscope of the invention taken along line 3—3 of FIG. 2.
Figure 4:
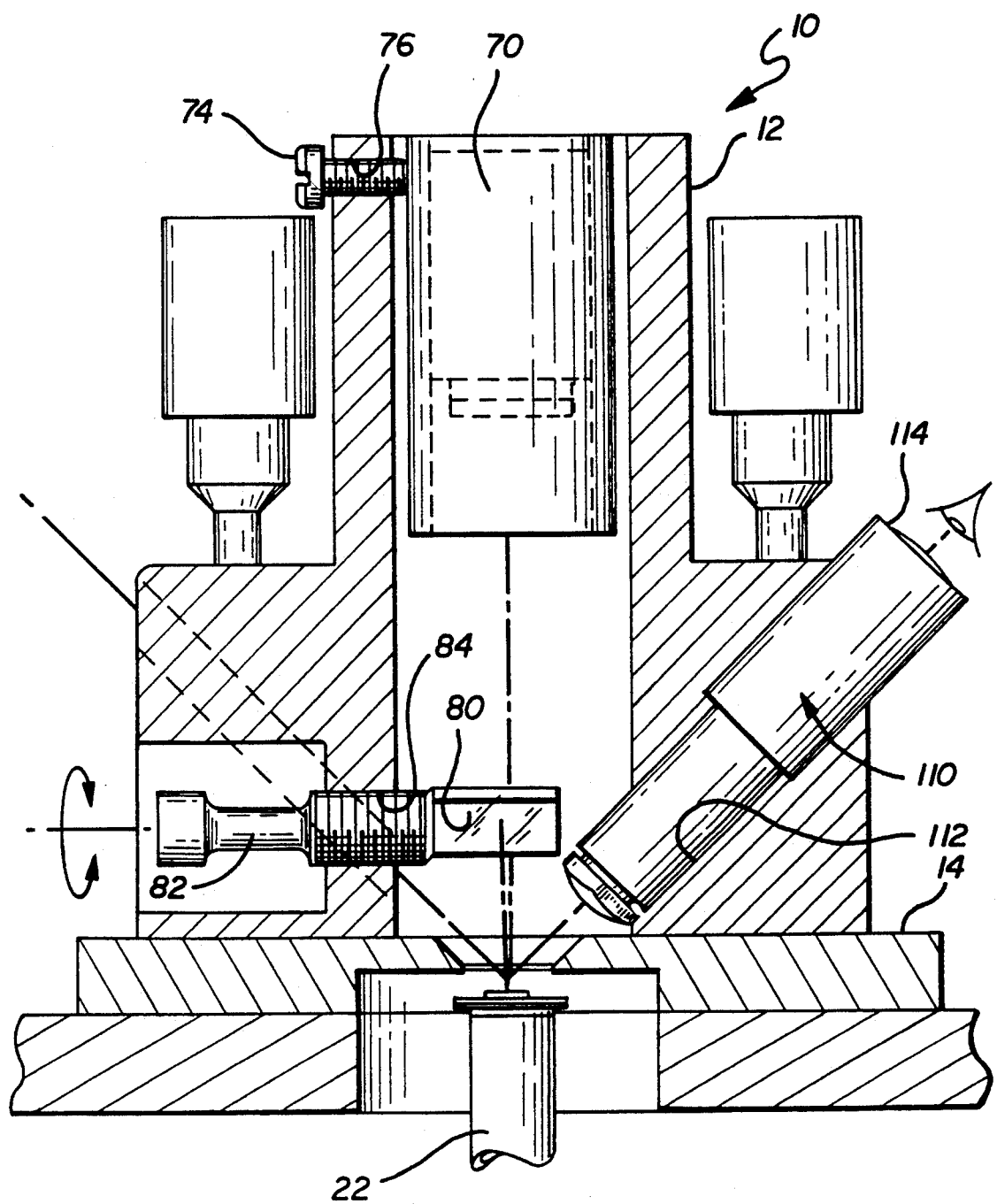
FIG. 4 is a sectional view of the scanning force microscope of the invention taken along line 4—4 of FIG. 2.
Figure 5:
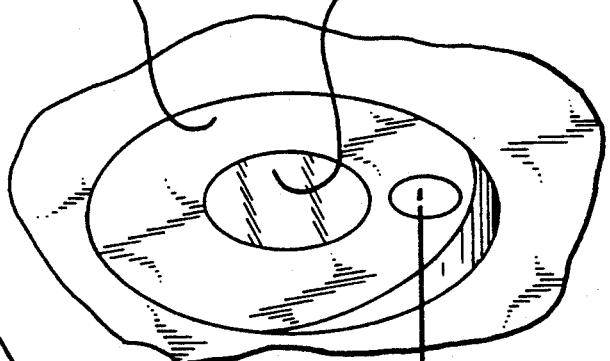
FIG. 5 is an enlarged, exploded view showing the mounting of the optical lever arm assembly of the scanning force microscope of the invention.
Figure 6:
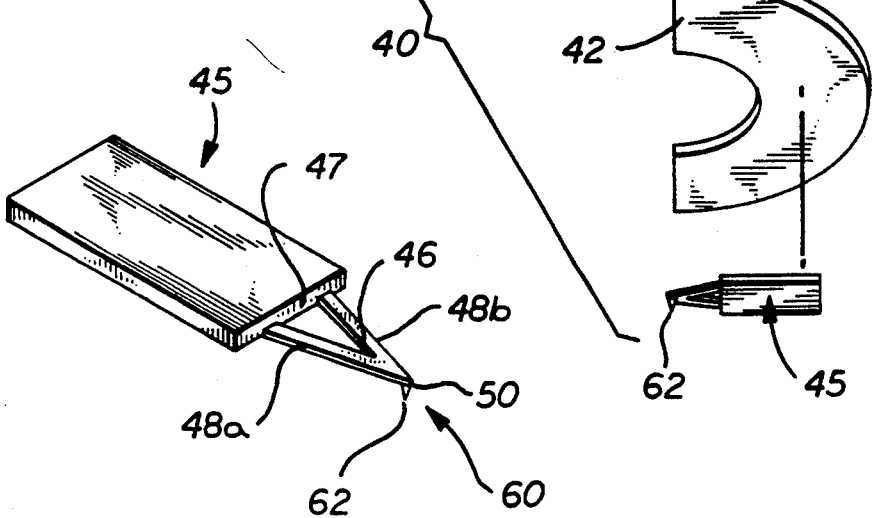
FIG. 6 is an enlarged perspective view of the integral support member, cantilever arm, and probe tip of the optical lever arm assembly of the invention.
Figure 7:
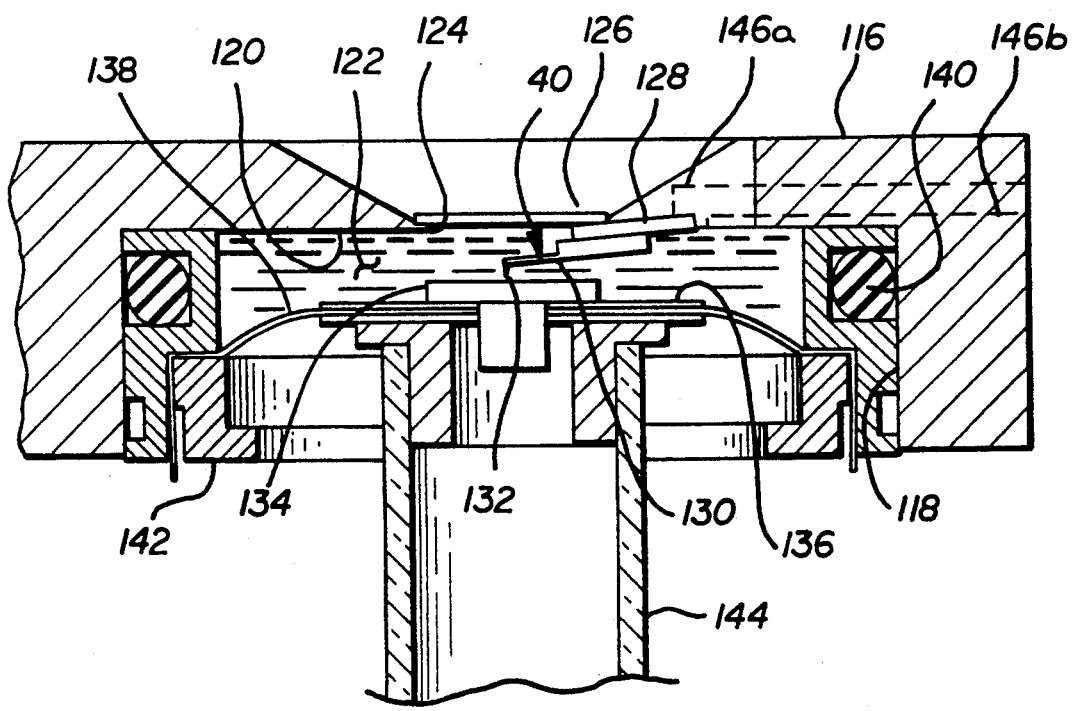
FIG. 7 is an enlarged, partial sectional view of an alternate embodiment of the scanning force microscope of the invention, including a fluid cell in the base of the scanning force microscope.

Scanning force microscopes commonly have such small optical lever arms that the optical lever arm and probe assembly can be easily damaged by mishandling, making them difficult to handle and mount in the instrument. Such microscopes also do not commonly allow the user to view the approach of the lever arm and probe assembly to the surface of the sample to insure precise positioning of the probe. Such microscopes typically also do not include the capability of scanning a sample in a sealed gas or liquid environment, limiting the quality and opportunities for viewing of specimens.

As is illustrated in the drawings, the invention is embodied in a scanning force microscope 10 having a stationary body 12 including a removable lower base 14 secured to the body by screws or bolts, with a chamber 16 for receiving a specimen 18, which is generally less than $\frac{1}{2}$" in diameter and 0.1 to 2 mm thick. The body is typically supported by a stationary support (not shown) also supporting a scanning means 20 for mounting of the specimen for examination, raster scanning the specimen in X and Y directions relative to the body, as shown by the arrows, that is, horizontally in two dimensions or degrees of freedom, and for moving the specimen in a vertical or Z dimension or degree of freedom relative to the body, as shown by the arrow, and as will be further explained. The scanning means is thus stationarily mounted with respect to the body of the microscope, and can also be secured to the body, but also includes a piezo tube 22 with a support stage 24 for the specimen at the distal end 26 of piezo tube, which is typically driven in the X, Y and Z dimensions by piezoelectric transducer elements (not shown). The stage also may include a magnet 28, to allow a specimen to be mounted by adhesion onto a small magnetic steel plate which can thus be magnetically secured on the top of the stage, allowing for the convenient interchange of specimens to be examined by the instrument.

An optical lever arm 40 is secured to the body, and preferably includes a half washer member 42 of magnetic steel, magnetically secured to a magnetized portion 44 of body. An integral cantilever support member 45 is mounted to a central portion of the half washer member, extending to the open middle portion of the half washer member. A reflective cantilever arm 46 formed in the shape of a triangle from first and second arms 48a, 48b is secured at one end to the free end 47 of the integral cantilever support member and joined together at their free ends 50. The arms of the cantilever arm are typically about 18 microns thick and about 200 microns long, secured to the integral cantilever support member about 120 microns apart, and although the silicon nitride material (available from Park Scientific Instruments) from which the cantilever arm is made is normally considered quite rigid, with these dimensions the cantilever arm bows and flexes as much as 30° in response to the force of the probe tipe against the specimen, amplifying the deflection of the laser beam, as will be explained further below. The integral cantilever support member and the reflective cantilever arm are so small that they are most conveniently etched from silicon nitride, although other materials such as silicon which can be etched or lend themselves to fine machining and which can provide a reflective surface, such as are well known to those skilled in the art of manufacturing of integrated circuit chips, may be suitable as well. Attached to the free end 50 of the cantilever arm is a probe means 60 including a distal needle-like probe tip 62 adapted to contact and follow the surface contours of the specimen. The scanning means preferably also includes feedback control means 64 for driving the piezo tube in the vertical dimension as the probe tip traverses the contours of the specimen, to maintain a substantially constant force of the probe means against the surface of the specimen.

A laser light source means 70 such as a laser diode with associated optics, is mounted in the upper portion of the body for producing a focused laser beam 72 directed at and deflected by the reflective cantilever arm. One preferred laser diode is a 3 milliwatt laser diode which produces a beam in the 670 nm range, and is commercially available. An opening 73 is provided in the removable base to allow the laser beam to pass through to the cantilever arm. Preferably three or more adjustment screws 74 for adjusting the alignment and aiming of the laser light source are mounted in threaded access ports 76 provided in body. A reflective means such as the planar mirror 80 is preferably mounted in the interior of the body at a distal end of an adjustment screw 82 through threaded access port 84 to reflect the deflected beam 86 to a photodetector 88 mounted to body for receiving the deflected laser beam.

The photodetector preferably generates an electrical output signal in response to the deflected laser beam indicative of the degree of deflection of the laser beam by the cantilever arm. The photodetector is mounted to receive the deflected laser beam through photodetector port 94 in the body, and is typically formed as an array of four photosensors 90, in which the top pair 92a is coupled to provide a combined signal, and the bottom pair 92b is coupled to provide a combined signal. The deflected laser beam is typically targeted at a central point between the top and bottom portions of the photodetector, and the combined signals from these portions are processed to generate output signals which can be compared to produce a differential error signal by control means 64. Additionally, the left and right halves of the array of photosensors may be summed for scanning in a frictional force mode.

The control means preferably comprises microprocessor means 102 electrically connected to the photodetector means to receive the output signals indicative of deflection of the laser beam from the optical lever arm means, and to generate the error signal indicative of a variance from the constant amount of force of the probe tip against the specimen surface. The control means is electrically connected to an electrical drive means 104 in the scanning means which is responsive to the error signal for raising and lowering the specimen with respect to the probe tip for increasing or decreasing the force of the probe tip against the specimen surface to maintain the substantially constant amount of force of the probe tip against the specimen surface.

In the preferred mode of the invention, means 110 for viewing the probe and adjacent surface contours of the specimen are disposed in accessory port 112 in the body of the microscope as well. An accessory objective optical device 114 or eyepiece is preferably provided in the accessory port to allow a user to view the probe and specimen. Although the accessory objective optical device preferably comprises one or more lenses focusing on the probe tip and cantilever arm, the accessory objective optical device may also include a charge couple device 115 mounted to the body adjacent to the bore and directed to image the probe means through the bore.

In one alternate preferred embodiment, the removable base 116 includes a chamber 118 which is dimensioned to receive a sealed cell 120 for containing the specimen. The sealed cell can be provided with a selected gas or liquid environment 122 for the specimen through ports 146a, b provided in the base for fluid transfer to the interior of the sealed fluid cell. The base includes an opening 124 for the optical path of the laser beam, with the opening being covered by an optical window 126, such as a thin pane of glass. The optical lever arm assembly includes the magnetic steel half washer member 128 magnetically secured to the body of the microscope, with the cantilever arm 130 mounted to the half washer member by an integral support member and bearing probe tip 132 extending into the fluid cell. The sample 134 is mounted on the stage 136, which in this embodiment includes an inner membrane seal 138 held in place in the fluid cell by a membrane frame member 142, and an outer O-ring seal 140 sealing the exterior of the fluid cell to the interior of the chamber of the base. The stage is in turn mounted on the lower piezo tube 144 of x, y, z scanning assembly, for raster scanning of the specimen and maintenance of a substantially constant force of the probe on the specimen.

It has therefore been demonstrated that the scanning force microscope of the invention provides for an improved mount for the probe of the microscope, which is easier to handle and install in the microscope. The improved mount also permits easier alignment of the laser beam onto the cantilever arm of the optical lever arm. The integrated optics of the microscope permits the user to view the approach of the lever arm and probe assembly to the surface of the sample to insure safe and precise positioning of the probe near the specimen. The scanning force microscope also includes the capability of receiving a sealed fluid cell for scanning a specimen in a fluid environment, which can significantly improve the quality of the image of the specimen produced by the instrument.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A scanning force microscope for examining surface contours of a specimen, comprising:
  a stationary body;
  scanning means for mounting of said specimen for examination by said scanning force microscope, said scanning means being secured to said stationary body and adapted to move said specimen in three degrees of freedom relative to said body;
  optical lever arm means secured to said stationary body, said optical lever arm means including a reflective surface;
  probe means secured to said optical lever arm means and including a probe tip adapted to contact and follow the surface contours of the specimen with a substantially constant amount of force;
  laser light source means for producing a focused laser beam directed at and deflected by said optical lever arm means;
  photodetector means for receiving said laser beam deflected by said optical lever arm means and generating an output indicative of a degree of deflection of said laser beam by said optical lever arm means, said photodetector means being mounted in said stationary body; and
  means for viewing said probe means adjacent to said surface contours of said specimen, said means for viewing being disposed in said stationary body.

2. The scanning force microscope of claim 1, wherein said means for viewing comprises an accessory objective lens.

3. The scanning force microscope of claim 1, wherein said means for viewing comprises a charge couple device.

4. The scanning force microscope of claim 1, wherein said optical lever arm means comprises a reflective cantilever arm.

5. The scanning force microscope of claim 4, wherein said probe means is mounted to a free end of said cantilever arm.

6. The scanning force microscope of claim 1, wherein said photodetector means includes a photodetector mounted to said body, and further including mirror means mounted within said body to deflect said laser beam from said optical lever arm means to said photodetector.

7. The scanning force microscope of claim 1, wherein said means for viewing comprises a bore through said body directed at said probe means, and an objective optical lens disposed in said bore focused on said probe means.

8. The scanning force microscope of claim 1, wherein said means for viewing comprises a bore through said body directed at said probe means, and a charge couple device mounted to said body adjacent to said bore and directed to image said probe means through said bore.

9. The scanning force microscope of claim 1, wherein said stationary body comprises a removable base having a chamber for receiving said specimen.

10. The scanning force microscope of claim 1, wherein said optical lever arm is magnetically secured to said body.

11. The scanning force microscope of claim 10, wherein said optical lever arm comprises a magnetic steel member magnetically secured to a magnetized portion of said body, a reflective cantilever arm secured to said magnetic steel member, and wherein said probe means is mounted to a free end of said cantilever arm.

12. The scanning force microscope of claim 1, wherein said scanning means includes control means for maintaining a constant force of said probe means against said surface contours of said specimen.

13. The scanning force microscope of claim 12, wherein said control means comprises means connected to said photodetector means for receiving said output signal indicative of deflection of said laser beam from said optical lever arm means, means for generating an error signal indicative of a variance from said constant amount of force of said probe tip against said specimen surface, and electrical drive means responsive to said error signal for raising and lowering said specimen with respect to said probe tip for increasing or decreasing the force of said probe tip against said specimen surface to maintain said substantially constant amount of force of said probe tip against said specimen surface.

14. The scanning force microscope of claim 9, wherein a sealed cell is mounted in said chamber of said removable base of said stationary body for containing said specimen.

15. The scanning force microscope of claim 14, wherein said sealed cell contains a selected gas or liquid environment for said specimen.

16. The scanning force microscope of claim 14, wherein said sealed cell includes a frame member adapted to interfit in sealing relationship in said chamber, and a membrane seal mounted in sealing relationship between said frame member and said scanning means for containing fluid in said sealed cell.

* * * * *

UNITED STATES PATENT AND TRADEMARK OFFICE
CERTIFICATE OF CORRECTION

PATENT NO. : 5,291,775
DATED : March 8, 1994
INVENTOR(S) : Ronald C. Gamble; Paul E. West It is certified that error appears in the above-indentified patent and that said Letters Patent is hereby corrected as shown below:

On title page, item [75]

In the inventor's name, change "Paul G. West" to --Paul E. West--.

Signed and Sealed this

Sixth Day of September, 1994

Attest:

BRUCE LEHMAN

*Attesting Officer*     *Commissioner of Patents and Trademarks*